United States Patent [19]

Matsumoto et al.

[11] Patent Number: 4,770,932

[45] Date of Patent: Sep. 13, 1988

[54] MAGNETIC RECORDING MEDIUM HAVING AN IMPROVED BACK COAT LAYER

[75] Inventors: Yukio Matsumoto, Mito; Hiroshi Togashi, Yamagata; Hiroshi Ogino; Kumiko Ojima, both of Mito, all of Japan

[73] Assignee: Victor Company of Japan, Ltd., Yokohama, Japan

[21] Appl. No.: 867,686

[22] Filed: May 28, 1986

[30] Foreign Application Priority Data

May 29, 1985 [JP] Japan .................................. 60-114184
May 31, 1985 [JP] Japan .................................. 60-116552

[51] Int. Cl.$^4$ .............................................. G11B 5/708
[52] U.S. Cl. .................................. 428/323; 427/128;
427/131; 428/328; 428/403; 428/407;
428/425.9; 428/695; 428/694; 428/900
[58] Field of Search ............... 428/694, 408, 695, 900,
428/403, 407, 323, 336, 328, 425.9; 427/131,
128; 360/134–136

[56] References Cited

U.S. PATENT DOCUMENTS

| | | | |
|---|---|---|---|
| 4,423,452 | 12/1983 | Kajimoto | 427/132 |
| 4,501,795 | 2/1985 | Takeuchi | 428/407 |
| 4,515,856 | 5/1985 | Matsumoto | 428/328 |
| 4,532,178 | 7/1985 | Matsumoto | 427/128 |
| 4,544,601 | 10/1985 | Yamaguchi | 428/900 |
| 4,547,425 | 10/1985 | Naruse | 427/128 |
| 4,584,243 | 4/1986 | Kadokura | 428/900 |
| 4,592,952 | 6/1986 | Miyoshi | 428/900 |
| 4,615,930 | 10/1986 | Matsumoto | 427/128 |
| 4,634,627 | 1/1987 | Fujiki | 428/407 |
| 4,640,863 | 2/1987 | Matsumoto | 427/128 |
| 4,649,072 | 3/1987 | Ryoke | 428/695 |
| 4,664,973 | 5/1987 | Kobayashi | 428/900 |
| 4,670,333 | 6/1987 | Miyoshi | 428/323 |
| 4,720,413 | 1/1988 | Horiguchi | 428/694 |

FOREIGN PATENT DOCUMENTS

| | | |
|---|---|---|
| 2250383 | 5/1974 | Fed. Rep. of Germany . |
| 3328594 | 9/1986 | Fed. Rep. of Germany . |
| 59-5423 | 12/1984 | Japan . |
| 59-5429 | 12/1984 | Japan . |
| 59-5430 | 12/1984 | Japan . |
| 1416946 | 12/1975 | United Kingdom . |
| 2080319A | 2/1982 | United Kingdom . |

*Primary Examiner*—Ellis P. Robinson
*Attorney, Agent, or Firm*—Lowe, Price, LeBlanc, Becker & Shur

[57] ABSTRACT

A magnetic recording medium which comprises a non-magnetic substrate, a magnetic recording layer formed on one side of said substrate, and a back coat layer formed on the other side of the substrate. The back coat layer is made of a composition which comprises particles of carbon black, titanium monoxide or a mixture thereof having an average size not larger than 1 micrometer and a resin binder dispersing the particles therein. The particles are individually precoated with an isocyanate compound. When coated titanium monoxide particles are used singly, non-coated carbon black is effectively used in combination.

9 Claims, No Drawings

MAGNETIC RECORDING MEDIUM HAVING AN IMPROVED BACK COAT LAYER

BACKGROUND OF THE INVENTION

1. Field of the Invention

This invention relates to magnetic recording mediums in the form of tapes or disks.

2. Description of the Prior Art

In recent years, the technical advancement in the field of magnetic recording and reproducing apparatus, such as domestic video tape recorders, is remarkable. High density recording is now being attained as a result of the technical advancement.

However, the high density recording is not only brought about by the progress in magnetic recording and reproducing apparatus, but has to be accompanied by an improvement in magnetic recording mediums corresponding to the technical progress of the apparatus.

In this view, it is believed that non-magnetic base films should have surfaces which are as smooth as possible. However, magnetic recording medium, which have a magnetic recording layer formed on smooth base films, have the problem of durability, such as a poor resistance to wear, along with the drawback of a poor travelling performance.

In order to solve the problems, there have been proposed magnetic recording mediums which have a back coat layer on one side of a base film opposite to a side on which a magnetic recording layer is formed (Japanese Laid-open Patent Application Nos. 59-5423, 59-5429 and 59-5430). However, these mediums do not have a satisfactory durability and undesirably tend to be electrically charged.

Moreover, there has also been proposed a magnetic recording medium having a back coat layer which is made of a composition comprising carbon black and lubricants dispersed in a binder. However, this medium is disadvantageous in that the carbon lack particles in the back coat layer are liable to come off when the medium is wound about reels. The resultant dust is transferred to the surface of the magnetic recording layer, causing dropout defects to occur and the travelling performance to lower.

SUMMARY OF THE INVENTION

It is an object of the invention to provide a magnetic recording medium which has a back coat layer containing chemically treated carbon black and/or titanium monoxide particles and thus, the medium is greatly improved in durability.

It is another object of the invention to provide a magnetic recording medium which has a small coefficient of dynamic friction and a stable travelling performance because of the presence of the back coat layer mentioned above.

According to the present invention, there is provided a magnetic recording medium which comprises a non-magnetic substrate, a magnetic recording layer formed on one side of the substrate, and a back coat layer formed on the other side of the substrate. The invention is characterized in tht the back coat layer contains carbon black or titanium monoxide particles chemically treated with an isocyanate compound and, thus, having a coating of the isocyanate compound in and on the individual particles. As a matter of course, the treated carbon black and titanium monoxide particles may be used singly or in combination. If the treated titanium monoxide particles are used, non-treated carbon black is preferably used in combination because of the high cost of titanium monoxide.

DETAILED DESCRIPTION AND EMBODIMENTS OF THE INVENTION

The magnetic recording medium of the invention has a back coat layer on one side of a non-magnetic substrate and a magnetic recording layer on the other side of the substrate. Since the present invention is charactrized by the back coat layer, the back coat layer is first described in detail.

The back coat layer is formed of a composition which comprises carbon black and/or titanium monoxide particles, which have been treated on the surfaces thereof with isocyanate compounds, dispersed in a resin binder. More particularly, the individual particles have a coating of the isocyanate compound in and on the surfaces thereof. Carbon black and titanium monoxide particles used for these purposes have generally an average size below 1 micrometer, preferably from 0.01 to 0.05 micrometers. Over 1 micrometer, the surface properties of the back coat layer deteriorate and electromagnetic conversion characteristics lower. In addition, dust comes off appreciably during the recording and reproducing operations. Accordingly, the average size should be below 1 micrometer. Carbon black particles should preferably have a specific surface area not larger than about 800 $m^2/g$ in order to ensure an effective surface treatment with isocyanate compounds.

The isocyanate compounds used to treat the particles may be aromatic and aliphatic isocyanate compounds having 2 or 3 isocyanate groups in one molecule thereof. Examples of the isocyanate compounds include diisocyanates such as tolylene diisocyanate, 4,4-diphenylmethane diisocyanate, xylylene diisocyanate, 4,4'-methylenebis(cyclohexylisocyanate), isophorone diisocyanate, naphthylene diisocyanate and the like, and triisocyanates such as triphenylmethane P,P',P''-triisocyanate, tris(4-phenylisocyanate)thiophosphate, trimethylpropane-1-methyl-2-isocyano-4-carbamate, diphenyl ether 2,4,4'-triisocyanate and the like. Aside from these compounds, polyisocyanates may be also used, including polymethylene/polyphenylisocyanate. These isocyanate compounds or materials may be used singly or in combination. The isocyanates useful in the present invention are readily available under the designations of Coronate L (triisocyanate obtained by reaction between 3 moles of tolylene diisocyanate and 1 mole of trimethylpropane) and Coronate LH (polyisocyanate obtained from hexamethylene diisocyanate) from Nippon Polyurethane Co., Ltd., D-103H from Takeda Chemical Ind. Co., Ltd., and the like.

For the treatment of carbon black or titanium monoxide particles, the particles and an isocyanate compound are placed in suitable solvents, such as toluene, dispersed for several hours, and dried at temperatures of 30° to 120° C. The isocyanate is coated on the particles in an amount of 1 to 100 wt%, preferably from 5 to 40 wt%, of the particles. The isocyanate compound of the particles is considered to chemically combine with the particles through urethanation or urea reaction with OH groups of the particles or moisture adsorbed in or on the particles, which will be present in small amounts in the particles.

On application, the treated or coated particles are dispersed in binders dissolved in solvents. The binders for this purpose include a variety of thermoplastic and thermosetting resins, typical of which are vinyl chloride copolymers, vinyl chloride-vinyl acetate copolymers, acrylic resins, urethane resins, cellulose derivatives, epoxy resins, phenolic resins, alkyd resins, isocyanate resins and the like. Of these, urethane and isocyanate resins are preferred because of good affinity for the treated particles. The chemically treated particles are generally used in an amount of from 25 to 400 parts by weight per 100 parts by weight of the binder used.

The point of the treated particles dispersed in a solution of a binder may be applied onto one side of a non-magnetic substrate by any known coating techniques such as spray coating, roll coating, electrostatic coating, brush coating and the like. The coated substrate is subsequently dried and calendered as usual to obtain a back coat layer. The back coat layer is generally formed in a thickness of from 0.3 to 4 micrometers.

The chemically treated carbon black and titanium monoxide particles may be used in combination. Because of the high price of titanium monoxide, the treated carbon black particles should preferably be used singly although the treated titanium monoxide particles may be used singly. When the treated titanium monoxide particles are used, it is preferred to use in combination with non-treated carbon black particles. The back coat layer containing chemically treated titanium monoxide particles and non-treated carbon black particles is significantly improved in durability and other properties over a back coat layer containing non-treated carbon black particles alone.

The amount of the treated titanium monoxide particles is in the range of from 0.5 to 70 wt%, preferably from 10 to 40 wt%, of non-treated carbon black. Less amounts are unfavorable because the addition of the treated titanium monoxide is not appreciable. One the other hand, over 70 wt%, the durability of the medium starts to lower along with lowerings of an antistatic effect and electromagnetic conversion characteristics. Non-treated carbon black used in combination with the treated titanium monoxide particles should have an average size below 1 micrometer, preferably from 0.01 to 0.05 micrometers, and a specific surface area of not larger than 800 m$^2$/g when determined by the BET absorption method. The carbon black is used in an amount of from 25 to 400 parts by weight per 100 parts by weight of binder.

The back coat layer is preferably formed in a dry thickness of from 0.3 to 4 micrometers.

The back coat layer may further comprise additives, such as lubricants, dispersants, abrasives and the like, if necessary.

The magnetic recording layer formed on the other side of the non-magnetic substrate may be made of any known resin composition comprising ferromagnetic metal oxides, metals and alloys of the metals in the form of fine powder dispersed in various types of binders known in the art. The non-magnetic substrate may be in the form of films, foils, sheets, disks and the like and may be made of a variety of materials such as polyesters, polyolefins, cellulose derivatives and the like, glasses, or ceramics.

The present invention is more particularly described by way of examples.

EXAMPLE 1

Carbon black having an average size of 0.02 micrometers and a BET absorption value of 250 m$^2$/g was treated with polyisocyanate (Coronate L, by Nippon Polyurethane Ind. Co., Ltd.) to coat the carbon black with the polyisocyanate in an amount of 8 wt% of the carbon black, followed by drying at 80° C. One hundred parts by weight of the treated carbon black, 55 parts by weight of nitro cellulose, 45 parts by weight of polyurethane, 2 parts by weight of a fatty acid lubricant, and 440 parts by weight of cyclohexanone serving as a solvent were mixed in a sand mill, followed by further adding 30 parts by weight of a polyisocyanate (Coronate L) to obtain a paint. This paint was applied onto a base film on the side thereof which was opposite to a side on which a magnetic recording layer had been formed, followed by drying at 80° C. for 3 minutes and calendering to form a 0.3 to 1.5 micrometer thick back coat layer, thereby obtaining a magnetic tape.

EXAMPLE 2

The general procedure of Example 1 was repeated except that the carbon black was treated with the polyisocyanate in an amount of 14 wt%, thereby obtaining a magnetic tape.

EXAMPLE 3

The general procedure of Example 1 was repeated except that the carbon black was treated with the polyisocyanate in an amount of 4 wt%, thereby obtaining a magnetic tape.

COMPARATIVE EXAMPLE 1

The general procedure of Example 1 was repeated except that carbon black not treated with polyisocyanate was used instead of the treated carbon black, thereby obtaining a magnetic tape.

COMPARATIVE EXAMPLE 2

The general procedure of Comparative Example 1 was repeated except that 30 parts by weight of the polyisocyanate in the paint was increased to 40 parts by weight, thereby obtaining a magnetic tape.

The magnetic tapes obtained in the above examples and comparative examples were subjected to measurement of a coefficient of dynamic friction and were checked with respect to a degree of scratch defects after travelling.

The coefficient of dynamic friction, $\mu_k$, was determined as follows. The magnetic tape was wound about a stainless steel pin having a diameter of 6 mm at a winding angle of 180° in such a way that the back coat layer was set inside. The tape was run at a rate of 10 mm/second under a backward tension of 50 g. The coefficient, $\mu_k$, after and fifty one cycles of recording and reproducing operations was obtained from the following equation $$\mu_k = (1/\pi)\ln(T_2/T_1)$$

in which $T_1$ is a tension at an inlet tension and $T_2$ is a tension at an outlet tension.

The degree of scratch defects was checked by visual observation of the defects in a magnetic tape which had been mounted in a commercial video tape recorder and subjected to 200 cycles of recording and reproducing operations. The results are shown in Table 1 below.

TABLE 1

| | Coefficient of Dynamic Friction | | |
|---|---|---|---|
| | after one cycle of recording and reproducing operations | after 50 cycles of recording and reproducing operations | Degree of Defects |
| Example: | | | |
| 1 | 0.176 | 0.201 | little |
| 2 | 0.210 | 0.233 | little |
| 3 | 0.198 | 0.235 | slight |
| Comparative Example: | | | |
| 1 | 0.218 | 0.289 | considerable |
| 2 | 0.209 | 0.272 | fair |

As will be apparent from the above table, the mediums of the invention which use coated carbon black particles in the back coat layer are advantageous in that the coefficient of dynamic friction increases only in a slight degree after 50 cycles of the recording and reproducing operations. Thus, the travelling performance is stable. In addition, the back coat layers suffer little scratch defects and are thus durable. On the other hand, the mediums of comparative examples, in which there are used carbon black particles not treated with polyisocyanate, greatly vary in the coefficient of dynamic friction when repeatedly run. Thus, the travelling stability is low. In addition, the coat layers are considerably damaged during the recording and reproducing operations.

EXAMPLE 4

A magnetic paint of a certain composition was applied onto one side of a base film, dried and treated in a usual manner. Another pair for back coating was prepared by mixing 100 parts by weight of non-treated carbon black, 60 parts by weight of nitro cellulose, 40 parts by weight of polyurethane resin, 0.8 parts by weight of titanium monoxide particles, which were treated with a polyisocyanate (Coronate HL) and had an average size of 0.01 micrometer, 5 parts by weight of stearic acid, 15 parts by weight of Coronate HL, and 850 parts by weight of cyclohexanone in a ball mill. The paint was applied onto the other side of the base film in a dry thickness of about 0.8 micrometers, followed by curing at 80° C. for 40 hours, thereby forming a back coat layer, thereby obtaining a magnetic tape. The tape had the magnetic layer on one side thereof and the back coat layer containing carbon black and coated titanium monoxide on the other side.

EXAMPLE 5

The general procedure of Example 4 was repeated except that 10 parts by weight of coated titanium monoxide having an average size of about 0.03 micrometer was used, thereby obtaining a magnetic recording medium.

EXAMPLE 6

The general procedure of Example 4 was repeated except that 30 parts by weight of coated titanium monoxide having an average size of about 0.13 micrometers was used, thereby obtaining a magnetic recording medium.

EXAMPLE 7

The general procedure of Example 4 was repeated except that 70 parts by weight of coated titanium monoxide having an average size of about 0.98 micrometers was used, thereby obtaining a magnetic recording medium.

COMPARATIVE EXAMPLE 3

The general procedure of Example 5 was repeated except that titanium monoxide not coated with Coronate HL was used instead of the coated titanium monoxide, thereby obtaining a magnetic recording medium.

COMPARATIVE EXAMPLE 4

The general procedure of Example 5 was repeated except that the coated titanium monoxide was not used, thereby obtaining a magnetic recording medium.

COMPARATIVE EXAMPLE 5

The general procedure of Example 5 was repeated except that chromium dioxide coated with Coronate HL was used instead of the coated titanium monoxide, thereby obtaining a magnetic recording medium.

COMPARATIVE EXAMPLE 6

The general procedure of Example 7 was repeated except that non-coated titanium monoxide was used, thereby obtaining a magnetic recording medium.

COMPARATIVE EXAMPLE 7

The general procedure of Example 6 was repeated except that titanium monoxide having an average size of about 1.9 micrometers and coated with Coronate HL was used, thereby obtaining a magnetic recording medium.

The magnetic recording mediums of Examples 4 through 7 and Comparative Examples 3 through 7 were set in a magnetic recording and reproducing apparatus and subjected to 500 cycles of recording and reproducing operations to determine a degree of scratch defects, a degree of dusting, and a coefficient of dynamic friction. The chrominance S/N ratio was also determined. The results are shown in Table 2 below. In the table, the degrees of scratch defects and dusting are graded as follows: no defects or dusting is evaluated as "very good"; a little degree of defects or dusting is evaluated as "good"; a fair degree of defects or dusting is evaluated as "poor"; and a considerable degree of defects or dusting is evaluated as "very poor".

TABLE 2

| | Degree of Scratch Defects | Degree of Dusting | Coefficient of Friction | Chrominance S/N Ratio (dB) |
|---|---|---|---|---|
| Example: | | | | |
| 4 | very good | very good | 0.12 | +3.5 |
| 5 | very good | very good | 0.11 | +3.6 |
| 6 | very good | very good | 0.10 | +3.0 |
| 7 | very good | very good | 0.11 | +2.6 |
| Comparative Example: | | | | |
| 3 | good | good | 0.28 | +3.4 |
| 4 | poor | poor | 0.26 | +3.5 |
| 5 | poor | good | 0.24 | +3.5 |
| 6 | good | good | 0.18 | +2.7 |
| 7 | very good | poor | 0.21 | +0.7 |

As will be seen from the above table, the mediums of comparative examples, in which coated titanium monoxide is not used, are poorer in degrees of defects and dusting than the mediums of the invention. Thus, the durability becomes poor with a poor running performance. When titanium monoxide is coated with the isocyanate compound but has an average size over 1 micrometer, a degree of dusting is considerable, causing the durability and the chrominance S/N ratio to deteriorate. Moreover, when titanium monoxide is not coated at all, the degrees of defects and dusting are inferior to those of the mediums of the present invention and the coefficient of friction undesirably increases.

What is claimed is:

1. In a magnetic recording medium which comprises a non-magnetic substrate, a magnetic recording layer formed on one side of said substrate, and a back coat layer formed on the other side of said substrate, the improvement characterized in that said back coat layer is made of a composition which comprises 25 to 400 parts by weight of particles of carbon black, titanium monoxide or a mixture thereof having an average size not larger than 1 micrometer, the individual particles being precoated with an isocyanate compound in an amount of from 1 to 100 weight percent of the particles, and 100 parts by weight of a resin binder dispersing the precoated particles therein.

2. A magnetic recording medium according to claim 1, wherein said particles are particles of carbon black having an average size of from 0.01 to 0.05 micrometers and a specific surface area of not larger than 800 $m^2/g$ when determined by the BET absorption method.

3. A magnetic recording medium according to claim 1, wherein the amount of the isocyanate compound coating ranges from 5 to 40 wt% of the particles.

4. A magnetic recording medium according to claim 1, wherein said particles are particles of titanium monoxide.

5. A magnetic recording medium according to claim 1, wherein said particles are particles of a mixture of carbon black and titanium monoxide.

6. In a magnetic recording medium which comprises a non-magnetic substrate, a magnetic recording layer formed on one side of said substrate, and a back coat layer formed on the other side of said substrate, the improvement characterized in that said back coat layer is made of a composition which comprises 25 to 400 parts by weight of carbon black particles having an average size not larger than 1 micrometer, titanium monoxide particles having an average size not larger than 1 micrometer and individually precoated with an isocyanate compound in an amount of from 1 to 100 weight percent of said titanium monoxide particles, said titanium monoxide particles being used in an amount of from 0.5 to 70 wt% of said carbon black particles, and 100 parts by weight of a resin binder dispersing the carbon black particles and the precoated titanium monoxide particles.

7. A magnetic recording medium according to claim 6, wherein the amount of the isocyanate compound ranges from 5 to 40 wt% of the titanium monoxide particles.

8. A magnetic recording medium according to claim 6, wherein the amount of the coated titanium monoxide particles is in the range of from 10 to 40 wt% of the carbon black.

9. A magnetic recording medium according to claim 6, wherein the back coat layer has a thickness of from 0.3 to 4 micrometers.

* * * * *